(12) United States Patent
Lee et al.

(10) Patent No.: US 8,427,755 B2
(45) Date of Patent: Apr. 23, 2013

(54) FLUIDIC LENS AND METHOD OF MANUFACTURING THE SAME

(75) Inventors: Jeong-yub Lee, Seoul (KR); Seung-wan Lee, Suwon-si (KR); Seung-tae Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

(21) Appl. No.: 12/787,787

(22) Filed: May 26, 2010

(65) Prior Publication Data

US 2011/0051255 A1 Mar. 3, 2011

(30) Foreign Application Priority Data

Aug. 31, 2009 (KR) ........................ 10-2009-0081633

(51) Int. Cl.
*G02B 1/06* (2006.01)
*G02B 3/12* (2006.01)

(52) U.S. Cl.
USPC .......................................... 359/665; 359/666

(58) Field of Classification Search ........... 359/665–667
See application file for complete search history.

(56) References Cited

U.S. PATENT DOCUMENTS

| | | | |
|---|---|---|---|
| 5,574,598 A | 11/1996 | Koumura et al. | |
| 6,188,526 B1 | 2/2001 | Sasaya et al. | |
| 7,256,943 B1 | 8/2007 | Kobrin et al. | |
| 7,359,124 B1 | 4/2008 | Fang et al. | |
| 7,369,321 B1 | 5/2008 | Ren et al. | |
| 7,440,193 B2 | 10/2008 | Gunasekaran et al. | |
| 7,580,195 B2 | 8/2009 | Choi et al. | |
| 2007/0030573 A1 | 2/2007 | Batchko et al. | |
| 2007/0201138 A1 | 8/2007 | Lo | |
| 2007/0211207 A1 | 9/2007 | Lo et al. | |
| 2007/0263293 A1 | 11/2007 | Batchko et al. | |
| 2008/0112059 A1 | 5/2008 | Choi et al. | |
| 2008/0144186 A1* | 6/2008 | Feng et al. | ............... 359/666 |
| 2008/0285143 A1 | 11/2008 | Batchko et al. | |
| 2009/0021823 A1 | 1/2009 | Heim et al. | |
| 2010/0079873 A1 | 4/2010 | Wang et al. | |
| 2010/0118413 A1 | 5/2010 | Kim et al. | |
| 2010/0118414 A1 | 5/2010 | Bolis | |
| 2010/0182703 A1 | 7/2010 | Bolis | |

FOREIGN PATENT DOCUMENTS

| | | |
|---|---|---|
| EP | 2192425 A1 | 6/2010 |
| JP | 6-308303 A | 11/1994 |
| JP | 7-49404 A | 2/1995 |

(Continued)

OTHER PUBLICATIONS

A. Werber, "Tunable, membrane-based, liquid-filled micro-lenses", Laboratory for Micro-optics, The 13th International Conference on Solid-State Sensors, Actuators and Microsystems, Seoul, Korea Jun. 5-6, 2005, vol. 1, pp. 1018-1021.

(Continued)

*Primary Examiner* — Evelyn A. Lester
(74) *Attorney, Agent, or Firm* — Sughrue Mion, PLLC

(57) ABSTRACT

A fluidic lens and method for manufacturing the same are provided. The fluidic lens includes a transparent optical fluid and a double elastomer membrane. An outer membrane of the double elastomer membrane that is externally exposed includes a Poly DiMethyl Siloxane (PDMS) elastomer, and an inner membrane of the double elastomer membrane that makes contact with the optical fluid is transparent and includes an elastomer which has a low coherence with respect to the optical fluid.

22 Claims, 8 Drawing Sheets

FOREIGN PATENT DOCUMENTS

| | | |
|---|---|---|
| JP | 2000-81503 A | 3/2000 |
| JP | 2009-175536 A | 8/2009 |
| JP | 2010-097200 A | 4/2010 |
| KR | 10-0672373 | 1/2007 |
| KR | 10-2008-0043106 A | 5/2008 |
| KR | 10-2008-0064237 A | 7/2008 |
| WO | 0201277 A2 | 1/2002 |
| WO | WO 2007/017089 A1 | 2/2007 |
| WO | 2008/082025 A1 | 7/2008 |
| WO | WO 2008/100154 A1 | 8/2008 |
| WO | 2009/010562 A1 | 1/2009 |
| WO | 2010/032869 A1 | 3/2010 |

OTHER PUBLICATIONS

European Search Report, dated Nov. 5, 2010, issued in Application No. 10171907.8.

Jeong et al. "Tunable Mircodoublet Lens Array" Optics Express 2004, vol. 12, No. 11, pp. 2494-2500.

Extended European Search Report issued in Application No. 10171910.2, dated Nov. 5, 2010.

European Patent Office, Communication dated Dec. 8, 2011, issued in corresponding European Patent Application No. 11163986.0.

Communication dated Apr. 3, 2012 issued by the European Patent Office in counterpart European Patent Application No. 11181168.3.

* cited by examiner

FLUIDIC LENS AND METHOD OF MANUFACTURING THE SAME

CROSS-REFERENCE TO RELATED APPLICATION

This application claims the benefit under 35 U.S.C. §119(a) of Korean Patent Application No. 10-2009-0081633, filed on Aug. 31, 2009, the disclosure of which is incorporated by reference in its entirety for all purposes.

BACKGROUND

1. Field

The following description relates to an optical lens, and more particularly, to a varifocal fluidic lens and a method of manufacturing the same.

2. Description of the Related Art

With the development of digital technologies, digital convergence continues to increase. Digital convergence has occurred most in the fields of media and communication. An example of a digital convergence product is a mobile communication device, in which an image pickup device such as a digital camera or a digital camcorder is coupled to the mobile communication device in addition to an apparatus having functions including: games, music playback, broadcast reception, and internet browsing. In general, other similar image pickup devices may be mounted on other types of mobile electronic device such as laptop computers or personal digital assistants (PDA).

Such mobile electronic devices having an image pickup device have become increasingly compact and slim line. Moreover, other digital electronic devices, for example, MP3 players, moving picture players or digital multimedia broadcasting (DMB) televisions are commonly mounted on the mobile communication device in addition to the image pickup device. For this reason, demands for an image pickup device which are increasingly compact and slim line continually grow. A wafer-level image pickup device is a small-sized camera module newly invented to satisfy such demands for miniaturization, slimness and economic efficiency.

When image pickup apparatuses originally started to be combined with mobile electronic devices, demands for high performance image pickup devices were not high. However, in recent times, in order to satisfy growing user demands for mobile electronic devices having a high quality image pickup device, mobile electronic devices having an image pick up device have become diversified. For example, different from the early days in which the limit of a close up function was 60 cm and a focal distance was fixed, in recent times, an auto-focusing function or a zoom function, and a shooting function at a close range below 30 cm are desired by users to be provided in such an image pickup device.

In order to implement an auto-focusing function, a zoom function and a close up function, a focal length of a lens needs to be changed. As an example of methods of varying a focal length in a wafer-level image pickup device, a fluidic lens also called a liquid lens has been suggested. The fluidic lens is formed by injecting an optical fluid into a membrane. In more detail, the fluidic lens changes a thickness of a lens portion of a membrane, that is, a curvature of a lens by applying a predetermined force to optical fluid filled in a membrane. Such a liquid lens can be fabricated to have a small structure, and is suitable for use as a varifocal optic lens used in a wafer-level image pick device.

SUMMARY

Accordingly, in one aspect, there is provided a fluidic lens of a wave-level image pick up device and a method of manufacturing the same, the fluidic lens capable of offering an auto-focusing function, a zoom function and a close up function.

In another aspect, there is provided a fluidic lens and a method of manufacturing the same, which exhibits the improved durability by preventing optical fluid from being absorbed or penetrated to a membrane.

In one general aspect, there is provided a fluidic lens. The fluidic lens includes a transparent optical fluid; and a membrane. The membrane includes an inner membrane of a transparent elastomer and an outer membrane of a Poly DiMethyl Siloxane (PDMS) elastomer. A coherence of the inner membrane with respect to the optical fluid is lower than a coherence of the outer membrane with respect to the optical fluid.

In another general aspect, there is provided a fluidic lens. The fluidic lens includes a transparent substrate, a spacer frame disposed on the transparent substrate, a double film structure membrane attached to the spacer frame, a transparent optic fluid disposed in an inner space defined by the space frame between the transparent substrate and the membrane. The inner space includes a lens portion and a driving portion. There is also an actuator disposed on a portion of the membrane corresponding to the driving portion, and a fixing frame disposed on the actuator. The spacer frame includes partitions which partition an upper portion of the inner space into the driving portion and the lens portion. A lower portion of the inner space is open throughout the entire transparent substrate and is not partitioned. The transparent optic liquid is filled in the inner space.

In another general aspect, a method of manufacturing fluidic lens is provided. The method is as follows. A first membrane including a Poly DiMethyl Siloxane (PDMS) elastomer is formed on a first subsidiary substrate and a second membrane includes a transparent elastomer and is formed on a second subsidiary substrate. An oxygen plasma treatment is performed on exposed surfaces of the first membrane and the second membrane. The exposed surface of the first membrane is attached to the exposed surface of the second membrane facing the exposed surface of the first membrane. The second subsidiary substrate is removed from the second membrane. A spacer frame, which defines an inner space of the spacer frame is attached on a surface of the second membrane exposed by removing the second subsidiary substrate from the second membrane. Optical fluid is injected into the inner space and a transparent substrate is attached on an exposed surface of the spacer frame. The first subsidiary substrate is removed from the first membrane. A coherence of the second membrane with respect to the optical fluid is lower than a coherence of the first membrane with respect to the optical fluid.

Other features will become apparent to those skilled in the art from the following detailed description, which, taken in conjunction with the attached drawings, discloses exemplary embodiments of the invention.

BRIEF DESCRIPTION OF THE DRAWINGS

FIGS. 3A, 3B and 3C are plan and cross sectional views of the fluidic lens of FIG. 2 wherein FIG. 3B is a cross sectional view of the fluidic lens to which a driving force has not been applied, and FIG. 3C is a cross section view of the fluidic lens to which a driving force has been applied.

Elements, features, and structures are denoted by the same reference numerals throughout the drawings and the detailed description, and the size and proportions of some elements may be exaggerated in the drawings for clarity and convenience.

DETAILED DESCRIPTION OF EXEMPLARY EMBODIMENTS

Figure 1A:
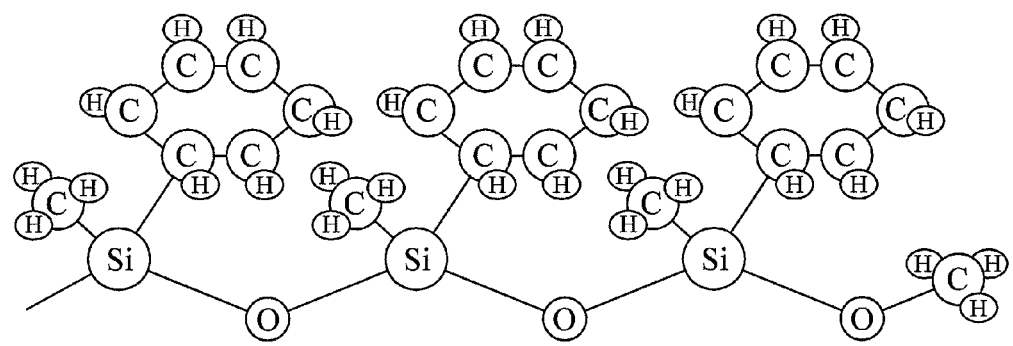
FIGS. 1A and 1B are views respectively showing a molecular structure of a Methyl phenyl Siloxane (MPS) oil and a Dimethyl Siloxane (DMS) oil.

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, the exemplary embodiments will be described with reference to accompanying drawings.

A fluidic lens has a configuration in which a transparent membrane having elasticity is attached to a frame filled with optical fluid. When the optical fluid is made to flow by applying a predetermined driving force to the liquid lens, the pressure produced by the flowing optical fluid is transferred to the optical membrane (specifically, all or part of the membrane which corresponds to a lens portion of the liquid lens), causing the shape (i.e., curvature) of the membrane to be changed. In such a manner, a profile of the membrane corresponding to a lens portion, that is, a curvature of a lens surface, is changed, thereby adjusting a traveling path of an incident beam.

The fluid lens may be alone used or added to an imaging optical system of an image pickup device. In the former case, the fluidic lens is capable of changing its focal distance by itself. In the latter case, the focal distance of the image pickup device is changed using the fluidic lens. The change in focal length enables the image pickup device to have variable focus functions such as an auto-focus function, a zoom function and a close up function.

In implementing such an image pickup device, a membrane used in a fluidic lens may beneficially have transparency, high elasticity and superior chemical stability. Examples of materials satisfying these requirements include a transparent silicon elastomer such as a Poly DiMethyl Siloxane (PDMS) elastomer, a Poly Methyl Phenyl Siloxane (PMPS) elastomer and a fluro-silicon elastomer. These silicon elastomers are generally susceptible to heat. To be used as a membrane of a fluidic lens, the glass transition temperature Tg of an elastomer should be as high as possible for use in a membrane of a fluidic lens which requires a high glass transition temperature Tg. In addition, in the case that a membrane is externally exposed from an image pickup device, the membrane should to be non-tacky to prevent contamination and damage (e.g. tears) due to adhesion of foreign substances.

A PDMS elastomer may be used as the silicon elastomer as it satisfies the above requirements. A PDMS membrane has high elasticity and transparency and is chemically stable due to its low surface tension and nonionic and non-polar properties. That is, the PDMS membrane is chemically stable not only at a high temperature but also provides heat resistance, weather resistance (ultraviolet rays and ozone), and oxidative stability. In addition, since the PDMS membrane has a high glass transition temperature Tg and has a non-tacky characteristic, the PDMS is prevented from being contaminated or torn due to adhesion of foreign substances.

Membranes (e.g. PDMS membranes) made of the above elastomers are porous. When a predetermined driving force is applied to the fluidic lens which is filled with an optical fluid, a lens surface of a membrane of the fluidic lens becomes convex (expands) due to the pressure from the optical fluid. Here, if the pressure from the optical fluid exceeds a critical level, the optical fluid may be absorbed by or penetrate into the porous membrane. Also, if the temperature of the optical fluid exceeds a critical level or if the optical fluid is in contact with the membrane for a long period of time in a hermetic space, the optical fluid may permeate into the porous membrane. Accordingly, when using a porous silicon elastomer (including a PDMS membrane) as a membrane of a fluidic lens, the permeation or penetration of an optical fluid should be prevented.

Hereinafter, an exemplary membrane used in a fluidic lens will be described in detail.

The optical fluid used in a fluidic lens should be transparent, non-volatile and chemically stable. In addition, the optical fluid should have the following physical and chemical properties.

First, the optical fluid may have a low viscosity, resulting in superior mobility. The viscosity of a liquid affects the flow speed thereof. A slow flow speed causes the optical fluid to respond slowly to a driving signal, and makes it difficult to precisely control the flow of the optic fluid. In more detail, when a pressing member such as an actuator applies a pressure to an optical fluid of a driving unit, a higher viscosity of the optical fluid increases the time required for the optical fluid in a lens portion to deform a lens surface, that is, it increases a response time. In addition, an optical fluid having a high viscosity may cause overshooting in which the lens surface is deformed more than expected due to the actual pressure applied on the optical fluid.

In this regard, a fluidic lens may use an optic fluid having as low viscosity as possible. A specific value of required viscosity of the optic fluid may vary according to the size of a fluidic lens and/or a force required to deform a lens portion. For example, the required viscosity of the optic fluid may depend on the area or the intensity of driving force of an actuator serving as a pressing member which is used to apply a pressure to a portion other than the lens portion. For example, in the case that a lens portion has a diameter of 3 mm and a displacement of the lens portion is caused by an actuator having an area three times larger than that of the lens portion, the optical fluid may have a viscosity of 1000 cP or less to achieve a response time of 10 ms or below and prevent overshooting.

Second, the optical fluid should be thermally stable within an operational temperature range (e.g., 30° C. to 85° C.) of an image pickup device (or a mobile electronic device using the image pickup device) having a fluidic lens. In more detail, the optical fluid should remain liquefied within an operational temperature range of an image pickup device. Otherwise, the optical lens may be damaged. In addition, the change in the volume or viscosity of the optical fluid according to temperature change should not be significant within the operation temperature range of the image pickup device. If the volume and viscosity change significantly according to temperature, the performance of the fluidic lens is degraded and the fluidic lens can not be controlled with precision.

Third, the optical fluid should be physically and chemically stable with respect to a membrane. In more detail, the optical fluid should not permeate or penetrate into a membrane, in particular, a porous membrane. For example, if the optical fluid has a large molecular size or has a high degree of polymerization, the penetration of optical fluid is restricted. In addition, the optical fluid should not deform a surface of a membrane. If a surface of the membrane wrinkles, the optic performance of the fluidic lens is degraded. To prevent the membrane from being wrinkled, the optic liquid should have predetermined properties. These properties of the optical fluid are determined by a coherence to materials constituting the membrane.

Examples of optical fluids that satisfy the above physical and chemical properties include silicon oil and silicon fluid. Silicon oil remains liquefied in a temperature range of about −55° C. to 200° C. In addition, silicon oil shows no significant change in its viscosity according to temperature, compared with other materials.

Figure 1B:
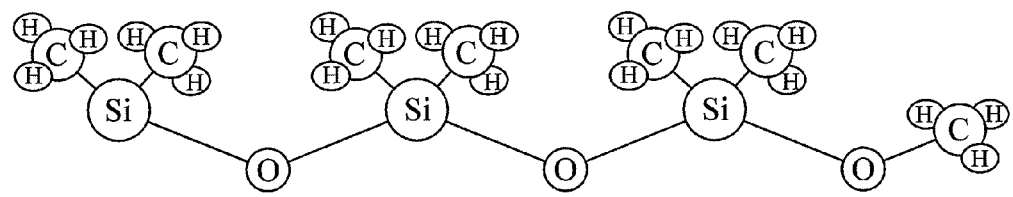

Examples of such oil include Methyl Phenyl Siloxane (MPS) oil and DiMethyl Phenyl Siloxane (DMS) oil. FIGS. 1A and 1B are views respectively showing a molecular structure of MPS oil and DMS oil. As shown in FIGS. 1A and 1B, the MPS oil and the DMS oil have a siloxane chain structure using —O—Si— as a basic unit. In MPS oil, methyl and phenyl groups are attached to the silicon element, wherein the content of methyl and phenyl groups may vary but the content of phenyl groups may not be small (e.g., 20% or more) In the DMS oil, only methyl groups are attached to the silicon element.

A methyl group attached in a siloxane chain of the DMS oil has a lower molecular weight and a small dipole moment than those of other organic groups such as a hydroxy group, a vinyl group and a carboxyl group. Thus DMS oil has a higher mobility than other silicon oil. In addition, the DMS oil has a higher degree of polymerization (represented by the number of —O—Si— which is a basic unit of silicon oil) than other silicon oil at the same viscosity, resulting in a high molecular weight of a unit polymer. For example, at a viscosity of 500 Cp, DMS oil has a degree of polymerization of 190 but MPS oil having a phenyl content of 44% has a degree of polymerization of 17. This indicates that, the DMS oil has a polymer molecular size ten or more times larger than those of MPS oil at the same viscosity of 500 Cp.

Similar to DMS oil, an example of silicon oil having a superior mobility and a high degree of polymerization may include dimethyl based silicon oil containing a great amount of methyl groups. The dimethyl based silicon oil containing a great amount of methyl group indicates silicon oil having a methyl group content of 80% among organic groups attached to siloxane chains. Similar to the DMS oil, in dimethyl based silicon oil, most groups attached to a siloxane chain are methyl groups, so that the physical property and chemical property are very similar to those of DMS oil.

As described above, DMS oil or dimethyl based silicon oil has a large molecular size at a low viscosity of, e.g., 1000 cP or less. When DMS oil or dimethyl based silicon oil has a low viscosity, a fluidic lens using such oil supports rapid response time and prevents overshooting. In addition, when DMS oil or dimethyl based silicon oil has a great degree of polymerization, a fluidic lens using such oil does not permeate or penetrate into a membrane.

In practice, a fluidic lens using MPS oil has a penetration at a lens sag of 30 μm, in which the term 'sag' (see 'd' in FIG. 3C) denotes the difference in height between highest and lowest points of a fluidic lens when the fluidic lens becomes convex. Therefore, a larger sag indicates a greater pressure applied to a membrane by optical fluid. However, a fluidic lens using DMS oil instead of MPS oil does not penetrate even at a pressure causing a lens sag of 70 μm. The specific size of the sag causing penetration of optical fluid may vary according to the shape of a fluidic lens in detail, according to the size of a lens portion and/or the pressure applied by an actuator and the area of a driving portion to which the pressure is applied.

Accordingly, if DMS oil or dimethyl based silicon oil is used as optical fluid in a porous membrane such as a PDMS membrane, permeation or penetration of optical fluid into the membrane is prevented. In addition, DMS oil or dimethyl based silicon oil has a molecular structure similar to that of a PDMS membrane, in which most groups attached to a siloxane chains are methyl groups. Accordingly, the coherence between the optical fluid and the membrane is very high. As a result, when the PDMS membrane makes contact with DMS oil, a contact portion of the membrane may wrinkle and the wrinkled portion of the membrane may roughen the surface of a lens. Accordingly, if the DMS oil makes contact with the PDMS membrane, a spherical lens having a superior profile is not easily obtained and the optical performance of the fluidic lens is degraded.

As one solution to prevent problems occurring when DMS oil is used together with a PDMS membrane, the exemplary membrane may be formed using a PMPS elastomer instead of a PDMS elastomer. That is, a PMPS membrane is used with DMS oil instead of using the PDMS membrane, so that penetration of optical fluid is prevented while obtaining a spherical lens with a superior profile. However, different from a PDMS membrane, a PMPS membrane has a low glass transition temperature Tg and has a tacky characteristic. Accordingly, if a fluidic lens having a PMPS membrane attached thereto is exposed to the air, the fluidic lens may be contaminated. In addition, alien substances attached to the membrane may cause the membrane to become ripped or may complicate the cleaning of the membrane.

As another solution to prevent problems occurring when DMS oil is used together with a PDMS membrane, MPS oil may be used instead of DMS oil as an optical fluid. However, as described above, since MPS oil has a low degree of polymerization, an optical fluid formed using the MPS oil may easily permeate or penetrate into a porous membrane. In addition, the MPS oil shows a significant change in viscosity with temperature, compared with DMS oil. For example, when varying the temperature from 20° C. to 0° C., the viscosity of the DMS oil increases from 3000 cP to 5000 cP i.e. by almost two times, but the viscosity of the MPS oil increases from 3000 cP to 80000 cP i.e. by over twenty times.

The exemplary fluidic lens uses a membrane having a double film structure in which an anti-wrinkle layer is provided at an inner surface of the PDMS membrane making contact with DMS oil, thereby applying merits of DMS oil and a PDMS membranes to the fluidic lens. In this case, the inner membrane is required to have a superior interfacial bonding property with respect to the PDMS membrane serving as an outer membrane and must prevent incident light from being reflected or scattered on an interface between the inner membrane and outer membrane.

To this end, the anti-wrinkle layer may be formed using an elastomer having a molecular structure similar to that of the PDMS membrane. For example, the anti-wrinkle layer serving as an inner membrane may be formed using a PMPS elastomer, a Poly Methyl Vinyl Siloxane (PMVS) elastomer or a fluoro-silicon elastomer. The PMPS elastomer, the PMVS elastomer or the fluoro-silicon elastomer allows the inner membrane to be easily bonded to the PDMS membrane. In addition, a PMPS elastomer, a PMVS elastomer or a fluoro-silicon elastomer has a low coherence with DMS oil. In particular, if a PMPS elastomer and a PMVS elastomer contain a Phenyl group of 20% or above and a Vinyl group of 20% or above, respectively, and each contain a Methyl group of 80% or below, the coherence of the PMPS elastomer and the PMVS membrane with respect to DMS oil is very low. Therefore, the PMPS elastomer or the PMVS elastomer allows the fluidic lens to be formed in a complete spherical lens without causing the PDMS membrane to be wrinkled.

Hereinafter, an exemplary fluidic lens having a double elastomer membrane including a PDMS membrane and a PMPS membrane and DMS oil interposed in the double elastomer membrane will be described. The configuration of a membrane and optical fluid provided in a fluidic lens has been described above and will be omitted to avoid redundancy. The following description will be made in relation to the configuration of the fluidic lens.

Figure 2:
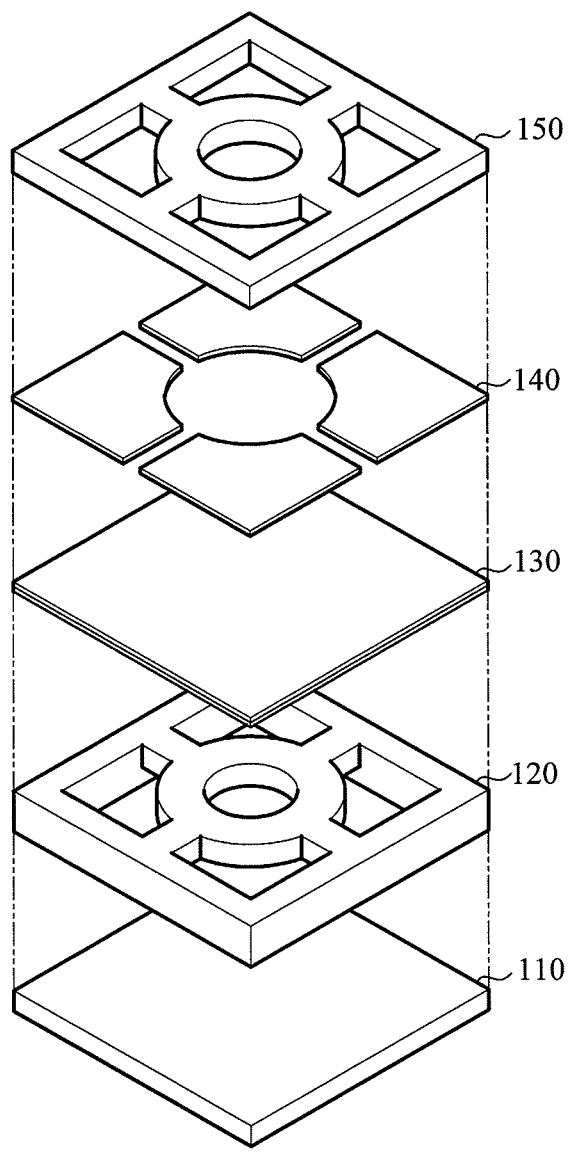
FIG. 2 is an exploded perspective view showing an exemplary fluidic lens.
Figure 3A:
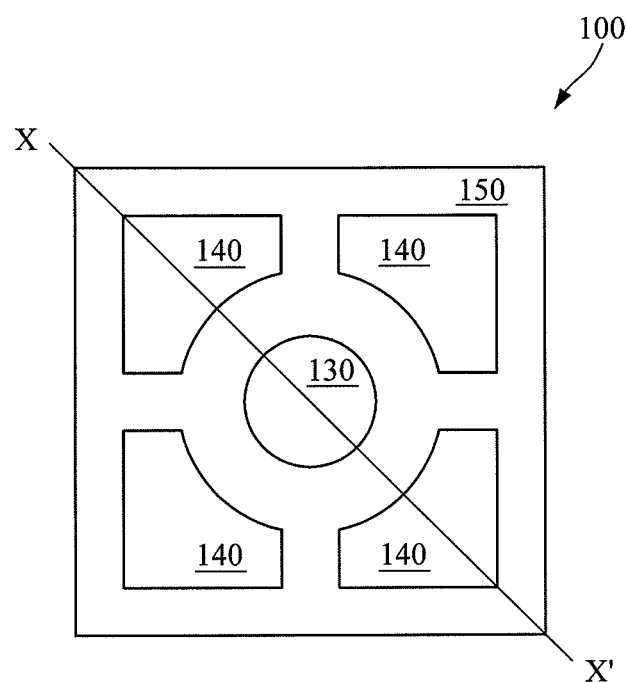
Figure 3B:
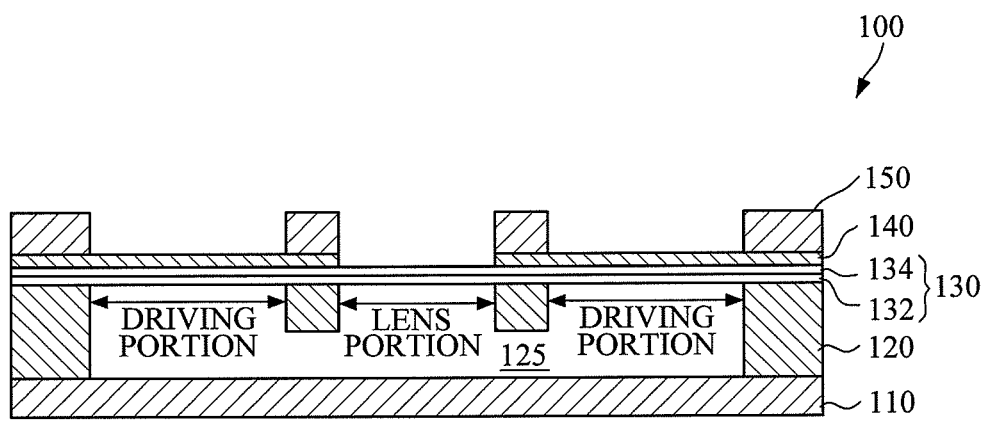
Figure 3C:
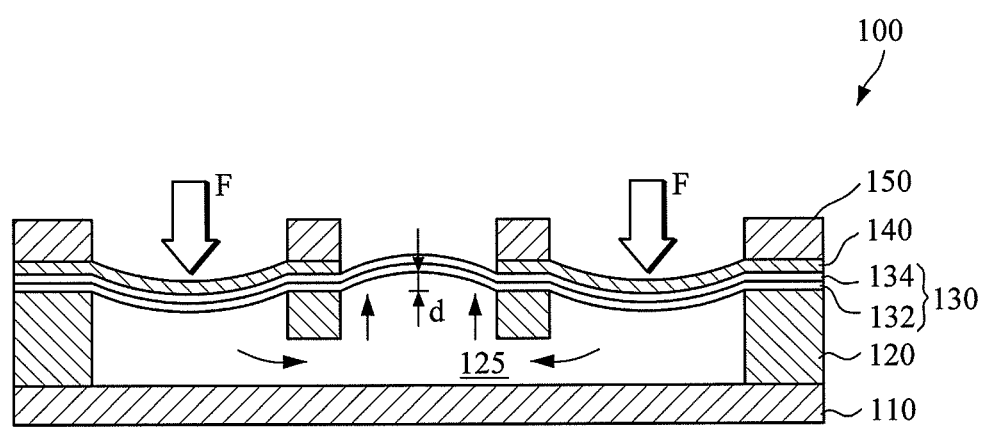

FIG. 2 is an exploded perspective view showing an exemplary fluidic lens, FIG. 3A is a plan view showing the fluidic lens shown in FIG. 2, FIG. 3B is a cross sectional view taken along line X-X' and showing the fluidic lens of FIG. 2 when a driving force is not applied to the fluidic lens, and FIG. 3C is a cross section view taken along line X-X' and showing the fluidic lens of FIG. 2 when a driving force is applied to the fluidic lens. As shown in FIGS. 2, 3A, 3B and 3C, a fluidic lens 100 includes a substrate 110, a spacer frame 120, an optical fluid 125, a membrane 130, an actuator 140 and a fixing frame 150.

The substrate 110 may be formed using a transparent material and is not limited to a particular type of substrate. For example, the substrate 110 may be a glass substrate or a transparent polymer substrate. The substrate 110 allows the fluidic lens 100 to be fixed to another module of an image pickup device and serves as a bottom portion of the spacer frame 120 to seal the optical fluid 125.

In the drawings, the substrate 110 and the membrane 130 are disposed opposite to each other with the spacer frame 120 interposed therebetween. However, this is merely an example. For example, a fluidic lens may be sealed in the space defined by the optical membrane 130 of the fluid lens 100, or the optical membrane may be implemented on each surface of the spacer frame that defines the inner space of the fluidic lens.

The spacer frame 120 defines the inner space of the fluidic lens 100 that can be filled with optical fluid 125. The spacer frame 120 may be formed using opaque materials such as silicon (Si), but the material forming the spacer frame 120 is not limited thereto. The inner space is divided into a lens portion and a driving portion by the spacer frame 120. In more detail, an upper portion of the inner space is divided into the lens portion and the driving portion by the spacer frame 120 and a lower portion of the inner space is not divided over the entire transparent substrate. The optical fluid 125 can freely flow in the lower portion of the inner space.

The lens portion is filled with the optical fluid 125 and serves as a lens through which incident light passes. The driving portion transfers a driving force capable of changing the profile of a portion (a lens surface) of the membrane 130 covering the lens portion. In more detail, as shown in FIG. 3C, when a predetermined pressure is applied downward onto the driving portion, that is, when a pressure (F) is applied by an actuator 140, the optical fluid 125 in the driving portion moves to the lens portion. The inflow of optical fluid increases the amount of optical fluid in the lens portion, thereby causing the lens portion to bulge upward. That is, the lens portion is deformed in the form of a convex lens having a sag of 'd.'. The deformed shape of the lens portion, that is, the size of the sag 'd' may arbitrarily be controlled by adjusting the pressure of the actuator 140.

The lens portion is located in the middle of the inner space defined by the spacer frame 120, and the driving portion surrounds the lens portion. Since the driving portion is disposed to surround the lens portion, if a driving force (F) is applied to the driving portion, the optical fluid is equally introduced from all directions to the lens portion. Accordingly, the lens portion is deformed in the form of an almost spherical lens, and the fluidic lens 100 offers superior optical performance. The driving portion may be divided into another number of sections. For example, the driving portion may be divided into four or more sections having several pairs of sections disposed symmetrically with respect to the lens portion.

The optical fluid 125 is filled in the inner space defined by the spacer frame 120. The optical fluid 125 is formed using a silicon oil which has a low viscosity and is made of a unit polymer having a great molecular weight. For example, if the optical fluid 125 is formed using a transparent silicon oil that has a degree of polymerization of 50 at a viscosity of 1000 cP or below, the fluidic lens 100 offers a response time required in an image pickup device. The optical fluid 125 may be formed using a DMS oil and a dimethyl based silicon oil containing a great amount of methyl groups. The silicon oil may be heated for one hour or more at a temperature greater than 150° C., thereby obtaining an optical fluid having a desired high degree of polymerization. Silicon oil is volatilized through heating to form, so that silicon oil has a high degree of polymerization.

The membrane 130 is attached to an upper surface of the spacer frame 120 to seal the optical fluid 125 in the inner space defined by the spacer frame 120. As described above, the membrane 130 has a double elastomer film structure including an inner membrane 132 and an outer membrane 134. Since the outer membrane 134 is externally exposed and may contact foreign substances, the outer member 134 is formed using a PDMS having a non-tacky property. The inner membrane 132 prevents the PDMS outer membrane 134 from being wrinkled due to contact with the optical fluid 125 such as a DMS oil. Accordingly, the inner membrane 132 enables the lens surface of the PDMS outer membrane 134 to have a profile in a spherical shape so that the fluidic lens 100 has superior optical performance. The inner membrane 132 may be formed using a transparent elastomer having a small coherence with the optical fluid 125. For example, the inner membrane 132 may be formed using a PMPS elastomer, a PMVS elastomer or a fluoro-silicon elastomer.

The membrane 130 may be provided in the form of a sheet or may be divided into a plurality of sections to seal the driving portion and the lens portion of the spacer frame 120. In the latter case, the membrane 120 may seal the lens portion but may not necessarily seal the driving portion. For example, when the actuator 140 is formed using a polymer, the membrane 120 may not necessarily cover the driving portion.

The actuator 140 is disposed on a portion of the membrane 130 to correspond to the driving portion. When the driving portion is divided into a plurality of sections, a plurality of actuators may be respectively disposed to correspond to the number of the driving portions. The actuator 140 may be bonded to the membrane 130 through a bonding member. The actuator 140 receives a driving force and exerts pressure on the optical fluid 125 corresponding to the driving portion so that optical fluid 125 corresponding to the driving portion flows to the lens portion. As a result, the membrane 130 on the lens portion bulges upward. As shown in FIGS. 3B and 3C, the actuator 140 may remain parallel to the transparent substrate 110 when receiving no driving voltage, and may bend downward when receiving a driving voltage. The degree to which the actuator bends 140 may be controlled by adjusting the intensity of the driving voltage. The actuator 140 may be an example of a pressure member that applies pressure on the optical fluid 125 of the lens portion. For example, instead of the actuator 140, a micro-pump may be also used to move the optical fluid 125 to the lens portion.

The actuator 140 may be provided in various types using various materials. The actuator 140 is formed using any actuator generally know in the art. For example, the actuator 140 may be an Electrode Active Polymer (EAP) actuator which is very thin and consumes low power or a relaxor ferroelectric polymer actuator made of a copolymer such as P(VDF-TrFE-CFE) and P(VDF-TrFE-CFTE).

The fixing frame 150 disposed on the actuator 140 securely fixes the membrane 130 and/or the actuator 140 to the spacer frame 120. The fixing frame 150 may have a planar shape that exposes at least the lens portion and the actuator 140. For example, the fixing frame 150 may have a planer shape identical to the space frame 120 divided into the driving portion and the lens portion. There are no particular restrictions on the material of the fixing frame 150. The fixing frame 150 may be formed using silicon.

Hereinafter, an exemplary method of manufacturing a fluidic lens will be described with reference to FIGS. 4A to 4F. In the following description, the outer membrane 134 is formed using a PDMS elastomer, the inner membrane 132 is formed using a PMPS elastomer, and the optical fluid 125 is formed using DMS oil, but it is obvious to those of ordinary skill in the art that materials forming the outer membrane 134, the inner membrane 132 and the optical fluid 125 are not limited thereto.

Figure 4A:
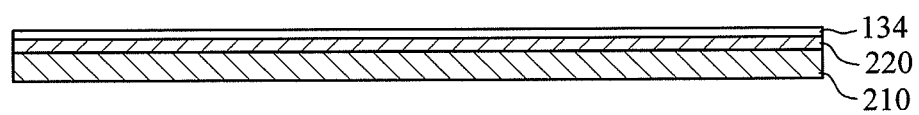
FIGS. 4A to 4F are cross sectional views showing an exemplary method of manufacturing a fluidic lens.

As shown in FIG. 4A, first, a PDMS elastomer layer 134 having a predetermined thickness is formed on a first subsidiary substrate 210. There is no particular restriction on material of the first subsidiary substrate 210. For example, the first subsidiary substrate 210 may be formed using a rigid wafer. In order that the first subsidiary substrate 210 is easily separated from the PDMS elastomer layer 134 in the following process, an anti-stiction coating 220 may be formed on the first subsidiary substrate 210 before the PDMS elastomer layer 134 is formed. The anti-stiction coating 220 may be formed using a photoresist (PR) or polytetrafluoroethylene (PTFE), for example Teflon®.

The method of forming the PDMS elastomer layer 134 on the first subsidiary substrate 210 is not limited. For example, first, the anti-stiction coating 220 is formed using PR or PTFE on the first subsidiary substrate 210. Then, a liquid PDMS elastomer is dispensed on the anti-stiction coating 220 to a thickness greater than a desired thickness. After that, the liquid PDMS elastomer is flattened in a desired thickness through a spin coating process, which is achieved by rotating the first subsidiary substrate 210, and/or using an applicator. Sequentially, the liquid PDMS elastomer having a desired thickness is subject to a thermal treatment or a hardening process at a predetermined temperature, for example, 110° C. for a predetermined time, for example, one hour, thereby obtaining a solidified PDMS elastomer layer 134.

Figure 4B:
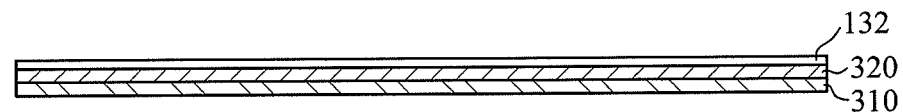

As shown in FIG. 4B, first, a PMPS elastomer layer 132 having a predetermined thickness is formed on a second subsidiary substrate 310. The second subsidiary substrate 310 may be formed using any material. For example, the second subsidiary substrate 310 may be formed using a PolyEthylen Teriphthalate (PET) film. Before the PMPS elastomer layer 132 is formed, an anti-stiction coating 320 may be formed on the second subsidiary substrate 310 so that the second subsidiary substrate 310 is easily separated from the PMPS elastomer layer 132 in the following process. The anti-stiction coating 320 may be formed using PR or PTFE. The method of forming the PMPS elastomer layer 132 on the second subsidiary substrate 310 is not limited, and may be identical to the method of forming the PDMS elastomer layer 134 on the first subsidiary substrate 210.

Figure 4C:
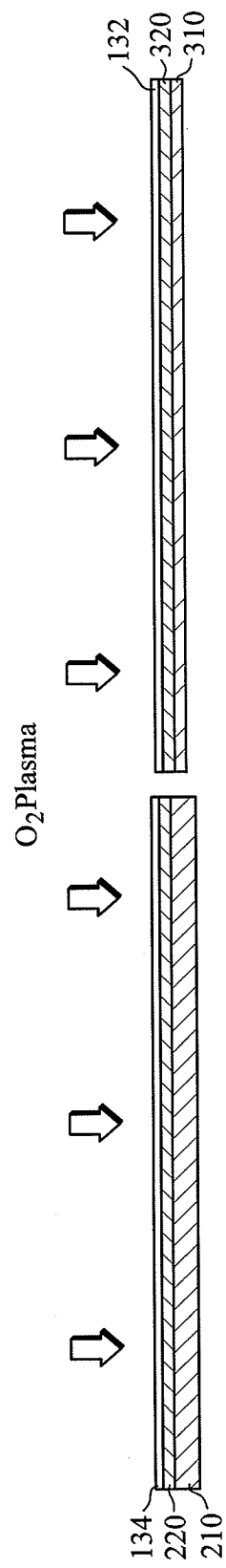

Sequentially, as shown in FIG. 4C, the PDMS elastomer layer 134 and the PMPS elastomer layer 132 are subject to an oxygen plasma treatment, which is performed at an operation power of 50 W or below for 30 sec or above. In this regard, bonding surfaces of the PDMS elastomer layer 134 and the PMPS elastomer layer 132 are subject to a surface treatment so that the PDMS elastomer layer 134 and the PMPS elastomer layer 132 are permanently bonded to each other. The oxygen plasma treatment generates Si—O free radicals that are excited from combustion of carbon components of a methyl group contained in the PDMS elastomer and the PMPS elastomer. In this case, if the bonding surfaces treated with oxygen plasma are bonded to each other, a permanent bonding is achieved between the PDMS elastomer 134 and the PMPS elastomer 132.

Figure 4D:
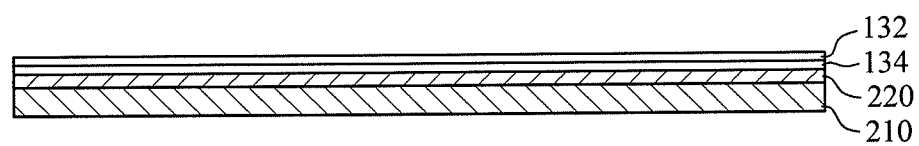

Sequentially, as shown in FIG. 4D, after the PDMS elastomer layer 134 has been bonded to the PMPS elastomer layer 132, the second subsidiary substrate 310 is removed. In this process, the anti-stiction layer 320 is removed together with the second subsidiary substrate 310. As a result, the PDMS elastomer layer 134 and the PMPS elastomer layer 132 bonded to each other remain on the first substrate 210 and the anti-stiction layer 220 stacked up against each other.

Figure 4E:
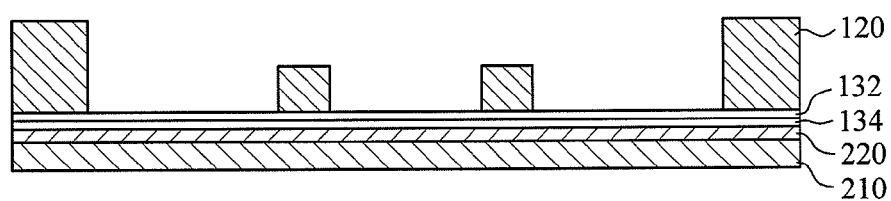

After that, a spacer frame 120 formed using silicon is prepared, and respective attaching surfaces of the PMPS elastomer layer 132 and the spacer frame 120 are subject to an oxygen plasma treatment at an operation power of 50 W or below for 30 sec or above, so that the PMPS elastomer layer 132 and the spacer frame 120 are permanently bonded to each other. After the oxygen plasma treatment has been performed, as shown in FIG. 4E, the spacer frame 120 is attached on the PMPS elastomer layer 132.

Figure 4F:
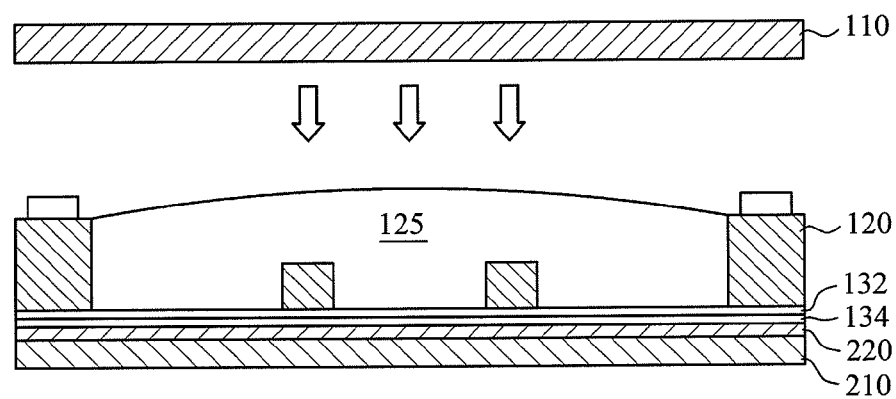

As shown in FIG. 4F, the inner space defined by the spacer frame 120 is filled with the optical fluid 125, for example, a DMS oil. A glass substrate 110 is attached to the spacer frame 120 to keep the optical fluid 125 in an air-tight state. To this end, first, an oxygen plasma treatment is performed on the PMPS elastomer layer 132, to which the spacer frame 120 is attached. The oxygen plasma treatment is performed to evenly distribute the optical fluid 125 in the inner space, and in the oxygen plasma treatment, Si—O radicals of the PDMS elastomer. After that, a sealant is coated on the spacer frame 120 to a predetermined thickness, and the glass substrate 110 is attached to the spacer frame 120. The attaching of the glass substrate 110 may be achieved through a press bonding at a vacuum state. Then, the sealant is cured through ultraviolet curing or thermal curing. The first subsidiary substrate 210 and the anti-stiction layer 220 are removed, and the actuator 140 and the fixing frame 150 are sequentially attached to the PDMS elastomer layer 134, thereby completing the fluidic lens 100 as shown in FIG. 2.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A fluidic lens comprising:
   a transparent optical fluid; and
   a double film structure membrane comprising:
   an inner membrane comprising a transparent elastomer, and
   an outer membrane comprising a Poly DiMethyl Siloxane (PDMS) elastomer,
   wherein a coherence of the inner membrane with respect to the optical fluid is lower than a coherence of the outer membrane with respect to the optical fluid, and
   wherein a surface of the inner membrane is attached to a surface of the outer membrane.

2. The fluidic lens of claim 1, wherein the optical fluid includes DiMethyl Siloxane (DMS) oil or DiMethyl based silicon oil having a methyl group content of about 80% among organic groups attached to siloxane chains.

3. The fluidic lens of claim 1, wherein the inner membrane comprises a Poly Methyl Phenyl Siloxane (PMPS) elastomer or a Poly Methyl Vinyl Siloxane (PMVS) elastomer.

4. The fluidic lens of claim 3, wherein the PMPS elastomer contains a Phenyl group of 20% or above, and the PMVS elastomer contains a Vinyl group of 20% or above.

5. The fluidic lens of claim 1, wherein the inner membrane comprises a fluoro-silicon elastomer.

6. The fluidic lens of claim 1, wherein the optical fluid comprises silicon oil having a viscosity of about 100 cP to 2000 cP.

7. The fluidic lens of claim 1, wherein the optical fluid comprises silicon oil comprising molecules each having a degree of polymerization of about 50 or above.

8. The fluidic lens of claim 1, wherein the inner membrane and the outer membrane each have a thickness of about 10 µm to 100 µm.

9. The fluidic lens of claim 1, wherein the fluidic lens comprises:
   a lens portion and a driving portion, and
   an actuator, disposed in the driving portion, which drives a movement of the optical fluid.

10. The fluidic lens of claim 1, further comprising:
    a substrate, a spacer frame, and a fixing frame;
    wherein the membrane is disposed between the spacer frame and the fixing frame and the optical fluid is disposed between the membrane and the substrate.

11. The fluidic lens of claim 10, further comprising:
    a lens portion and a driving portion, and
    an actuator disposed on the membrane in the driving portion, which drives a movement of the optical fluid.

12. A fluidic lens comprising:
    a transparent substrate;
    a spacer frame which is disposed on the transparent substrate;
    a double film structure membrane which is attached to the spacer frame;
    a transparent optic fluid disposed within an inner space defined by the spacer frame between the transparent substrate and the membrane;
    wherein the inner space comprises a lens portion and a driving portion;
    an actuator, disposed on a portion of the membrane corresponding to the driving portion; and
    a fixing frame which is disposed on the actuator,
    wherein the membrane comprises an inner membrane comprising a transparent elastomer, and an outer membrane comprising a Poly DiMethyl Siloxane (PDMS) elastomer, wherein a coherence of the inner membrane with respect to the optical fluid is lower than a coherence of the outer membrane with respect to the optical fluid, and
    wherein a surface of the inner membrane is attached to a surface of the outer membrane.

13. The fluidic lens of claim 12, wherein the lens portion is disposed at a central portion of the inner space and the driving portion surrounds the lens portion.

14. The fluidic lens of claim 12, wherein the spacer frame comprises partitions which partition an upper portion of the inner space into the driving portion and the lens portion, whereby a lower portion of the inner space is not partitioned.

15. The fluidic lens of claim 12, wherein the inner membrane comprises a Poly Methyl Phenyl Siloxane (PMPS) elastomer or a Poly Methyl Vinyl Siloxane (PMVS) elastomer.

16. The fluidic lens of claim 15, wherein the PMPS elastomer comprises a Phenyl group of a 20% or above, and the PMVS elastomer comprises a Vinyl group of 20% or above.

17. The fluidic lens of claim 12, wherein the optical fluid comprises DiMethyl Siloxane oil or DiMethyl based silicon oil comprising a methyl group.

18. A method of manufacturing fluidic lens, the method comprising:
    forming a first membrane, comprising a Poly DiMethyl Siloxane (PDMS) elastomer on a first subsidiary substrate and forming a second membrane, comprising a transparent elastomer, on a second subsidiary substrate;
    performing an oxygen plasma treatment on exposed surfaces of the first membrane and the second membrane;
    attaching the exposed surface of the first membrane to the exposed surface of the second membrane;
    removing the second subsidiary substrate from the second membrane;
    attaching a spacer frame, which defines an inner space, on a surface of the second membrane exposed by removing the second subsidiary substrate;
    injecting an optical fluid into the inner space and attaching a transparent substrate on an exposed surface of the spacer frame; and
    removing the first subsidiary substrate from the first membrane;
    wherein a coherence of the second membrane with respect to the optical fluid is lower than a coherence of the first membrane with respect to the optical fluid.

19. The method of claim 18, wherein the oxygen plasma treatment is performed at a power of 50 W or below for about 30 sec or more.

20. The method of claim 18, further comprising, subsequent for forming the first membrane, performing a thermal treatment of the PDMS elastomer at a temperature of about 110° C. for about one hour.

21. A fluidic lens comprising:
    an optical fluid comprising transparent silicon oil which has a degree of polymerization of about 50 or above at a viscosity of 1000 cP or below; and
    a first membrane comprising a Poly DiMethyl Siloxane (PDMS) elastomer.

22. The fluidic lens of claim 21, further comprising a second membrane, which comprises a Poly Methyl Phenyl Siloxane (PMPS) elastomer and is formed on an inner surface of the first membrane,
    wherein the silicon oil comprises DiMethyl Siloxane oil.

* * * * *